US 7,002,965 B1

(12) United States Patent
Cheriton (10) Patent No.: US 7,002,965 B1
(45) Date of Patent: Feb. 21, 2006

(54) METHOD AND APPARATUS FOR USING TERNARY AND BINARY CONTENT-ADDRESSABLE MEMORY STAGES TO CLASSIFY PACKETS

(75) Inventor: David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 772 days.

(21) Appl. No.: 09/862,018

(22) Filed: May 21, 2001

(51) Int. Cl.
H04L 12/56 (2006.01)

(52) U.S. Cl. ............... 370/395.32; 370/392; 709/238; 711/108

(58) Field of Classification Search ............... 370/392, 370/469, 395.1–395.2, 401; 707/1, 6; 709/238; 711/108
See application file for complete search history.

(56) References Cited

U.S. PATENT DOCUMENTS

| 3,648,254 | A | | 3/1972 | Beausoleil |
| 4,296,475 | A | | 10/1981 | Nederlof et al. |
| 4,791,606 | A | | 12/1988 | Threewitt et al. |
| 4,996,666 | A | | 2/1991 | Duluk, Jr. |
| 5,088,032 | A | | 2/1992 | Bosack |
| 5,319,763 | A | | 6/1994 | Ho et al. |
| 5,383,146 | A | | 1/1995 | Threewitt |
| 5,386,413 | A | * | 1/1995 | McAuley et al. ........... 370/392 |
| 5,440,715 | A | | 8/1995 | Wyland |
| 5,450,351 | A | | 9/1995 | Heddes |
| 5,481,540 | A | | 1/1996 | Huang |
| 5,509,006 | A | * | 4/1996 | Wilford et al. ............. 370/401 |
| 5,515,370 | A | | 5/1996 | Rau |
| 5,740,171 | A | | 4/1998 | Mazzola et al. |
| 5,841,874 | A | | 11/1998 | Kempke et al. |
| 5,842,040 | A | | 11/1998 | Hughes et al. |
| 5,898,689 | A | | 4/1999 | Kumar et al. |
| 5,920,886 | A | | 7/1999 | Feldmeier |
| 5,930,359 | A | | 7/1999 | Kempke et al. |
| 5,956,336 | A | | 9/1999 | Loschke et al. |
| 5,978,885 | A | | 11/1999 | Clark, II |
| 6,000,008 | A | | 12/1999 | Simcoe |

(Continued)

OTHER PUBLICATIONS

McAuley, Anthony J. et al., Fast Routing Table Lookup Using CAMs, 1993, IEEE, 0743-166X/93, pp. 1382-1391.*

(Continued)

Primary Examiner—Brian Nguyen
Assistant Examiner—Tri H. Phan
(74) Attorney, Agent, or Firm—The Law Office of Kirk D. Williams (57) ABSTRACT

Methods and apparatus are disclosed herein for classifying packets using ternary and binary content-addressable memory stages to classify packets. One such system uses a stage of one or more TCAMS followed by a second stage one or more CAMS (or alternatively some other binary associative memories such as hash tables or TRIEs) to classify a packet. One exemplary system includes TCAMs for handling input and output classification and a forwarding CAM to classify packets for Internet Protocol (IP) forwarding decisions on a flow label. This input and output classification may include, but is not limited to routing, access control lists (ACLs), quality of service (QoS), network address translation (NAT), encryption, etc. These IP forwarding decisions may include, but are not limited to IP source and destination addresses, protocol type, flags and layer 4 source and destination ports, a virtual local area network (VLAN) id and/or other fields.

31 Claims, 5 Drawing Sheets

U.S. PATENT DOCUMENTS

| | | | |
|---|---|---|---|
| 6,041,389 A | 3/2000 | Rao | |
| 6,047,369 A | 4/2000 | Colwell et al. | |
| 6,052,683 A * | 4/2000 | Irwin | 707/8 |
| 6,061,368 A | 5/2000 | Hitzelberger | |
| 6,067,574 A * | 5/2000 | Tzeng | 709/247 |
| 6,069,573 A | 5/2000 | Clark, II et al. | |
| 6,081,440 A | 6/2000 | Washburn et al. | |
| 6,091,725 A | 7/2000 | Cheriton et al. | |
| 6,097,724 A | 8/2000 | Kartalopoulos | |
| 6,134,135 A | 10/2000 | Andersson | |
| 6,137,707 A | 10/2000 | Srinivasan et al. | |
| 6,141,738 A | 10/2000 | Munter et al. | |
| 6,148,364 A | 11/2000 | Srinivasan et al. | |
| 6,154,384 A | 11/2000 | Nataraj et al. | |
| 6,175,513 B1 | 1/2001 | Khanna | |
| 6,181,698 B1 | 1/2001 | Hariguchi | |
| 6,199,140 B1 | 3/2001 | Srinivasan et al. | |
| 6,226,710 B1 * | 5/2001 | Melchior | 711/108 |
| 6,236,658 B1 | 5/2001 | Essbaum et al. | |
| 6,237,061 B1 | 5/2001 | Srinivasan et al. | |
| 6,240,003 B1 | 5/2001 | McElroy | |
| 6,243,667 B1 | 6/2001 | Kerr et al. | |
| 6,246,601 B1 | 6/2001 | Pereira | |
| 6,247,108 B1 * | 6/2001 | Long | 711/216 |
| 6,295,576 B1 | 9/2001 | Ogura et al. | |
| 6,307,855 B1 | 10/2001 | Hariguchi | |
| 6,389,506 B1 | 5/2002 | Ross et al. | |
| 6,526,474 B1 | 2/2003 | Ross | |
| 6,643,260 B1 * | 11/2003 | Kloth et al. | 370/235 |
| 6,651,096 B1 | 11/2003 | Gai et al. | |
| 6,658,002 B1 * | 12/2003 | Ross et al. | 370/392 |
| 6,658,458 B1 | 12/2003 | Gai et al. | |
| 6,658,482 B1 * | 12/2003 | Chen et al. | 709/245 |
| 6,665,297 B1 * | 12/2003 | Hariguchi et al. | 370/392 |
| 6,687,144 B1 | 2/2004 | Batson et al. | |
| 6,715,029 B1 | 3/2004 | Trainin et al. | |
| 6,732,227 B1 * | 5/2004 | Baumann | 711/108 |
| 6,738,862 B1 | 5/2004 | Ross et al. | |
| 6,862,281 B1 * | 3/2005 | Chandrasekaran | 370/392 |
| 6,871,262 B1 | 3/2005 | Oren et al. | |

OTHER PUBLICATIONS

Nilson, Stefan et al., IP-Address Lookup Using LC-Tries, Jun. 1999, IEEE, 0733-8716/99, vol. 17, pp. 1083-1092.*

Huan Liu, Reducing Routing Table Size Using Ternary-CAM, Mar. 2001, IEEE, 7695-1357-3/01, pp. 69-73.*

Jon P. Wade and Charles G. Sodini, "A Ternary Content Addressable Search Engine," IEEE Journal of Solid-State Circuits, vol. 24, No. 4, Aug. 1989, pp. 1003-1013.

Teuvo Kohonen, Content-Addressable Memories, 1987, pp. 128-129 and 142-144, Springer-Verlang, New York.

Brian Dipert, ed., "Special-purpose SRAMs Smooth the Ride," EDN, Jun. 24, 1999, pp. 93-104.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN-N25, Rev. 0a, Music Semiconductors, Milpitas, CA, Oct. 1, 1998, 16 pages.

"Using MUSIC Devices and RCPs for IP Flow Recognition," Application Note AN-N27, Rev. 0, Music Semiconductors, Milpitas, CA, Oct. 21, 1998, 20 pages.

"Wide Ternary Searches Using Music CAMs and RCPs," Application Note AN-N31, Rev. 0, Music Semiconductors, Milpitas, CA, Apr. 13, 1999, 8 pages.

* cited by examiner

METHOD AND APPARATUS FOR USING TERNARY AND BINARY CONTENT-ADDRESSABLE MEMORY STAGES TO CLASSIFY PACKETS

FIELD OF THE INVENTION

This invention relates to communications and computer systems, and in particular routers and packet switching systems; and more particularly, the invention relates to using ternary and binary content-addressable memory stages to classify packets.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for access control lists (ACLs) and forwarding decisions is a demanding part of switch and router design. This packet classification of a received packet is increasingly becoming more difficult due to ever increasing packet rates and number of packet classifications. For example, ACLs require matching packets on a subset of fields of the packet flow label, with the semantics of a sequential search through the ACL rules. IP forwarding requires a longest prefix match.

One known approach uses a bank of ternary content-addressable memories (TCAMs) to perform packet classification. TCAMs allow the use of wildcards in performing their matching, and thus are more flexible than binary content-addressable memories (CAMs). When this bank of TCAMs is properly programmed, the TCAMs are able to perform such a match in a single lookup. However, TCAMs consume a lot of power, are of limited size and cost more than conventional memory. Needed are new approaches and systems for providing packet classification.

SUMMARY OF THE INVENTION

Systems and methods are disclosed for using ternary and binary content-addressable memory stages to classify packets. One embodiment includes a ternary content-addressable memory to receive the set of information and to produce a first result. A binary content-addressable memory receives the first result or a second result derived from the first result, and generates one or more classification indications.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Methods and apparatus are disclosed using ternary and binary content-addressable memory stages to classify packets. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention.

As used herein, the term "packet" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units.

Methods and apparatus are disclosed herein that use ternary and binary content-addressable memory stages to classify packets. One embodiment uses a stage of one or more TCAMS followed by a second stage one or more CAMS (or alternatively some other binary associative memories such as hash tables or TRIEs) to classify a packet. One exemplary system includes TCAMs for handling input and output classification and a forwarding CAM to classify packets for Internet Protocol (IP) forwarding decisions on a flow label. This input and output classification may include, but is not limited to routing, access control lists (ACLs), quality of service (QoS), network address translation (NAT), encryption, etc. These IP forwarding decisions may include, but are not limited to IP source and destination addresses, protocol type, flags and layer 4 source and destination ports, a virtual local area network (VLAN) id and/or other fields. One embodiment may include a hash directory of flow labels implemented in a large static random access memory (SRAM) suitable for flow classification for netflow statistics, microflow policing and redirection. In one embodiment, upon packet reception, the packet flow label is extracted from the received packet and passed to the classification TCAMs. The index returned from the TCAMs is used to map to a mask to use for lookup in the hash directory. This mapping, for example, can also specify other attributes such as whether to monitor, police or redirect the flow. The flow label is then looked up in the hash directory using this mask. If a matching hash directory entry is found, the handling specified by this directory entry is used, overriding the relevant handling that may have been determined by earlier packet classification mechanisms.

One embodiment also provides a netflow capability to serve double duty in a system, providing both netflow monitoring capability as well as providing extra capacity to the TCAMs for packet classification. In one embodiment, upon packet reception, the packet flow label is extracted from the received packet and passed to the classification TCAMs. The index returned from the TCAMs is used to map to a mask to use for lookup in the hash directory. This mapping, for example, can also specify other attributes such as whether to monitor, police or redirect the flow. The flow label is then looked up in the hash directory using this mask. If a matching hash directory entry is found, the handling specified by this directory entry is used, overriding the relevant handling that may have been determined by earlier packet classification mechanisms.

Some mechanism, such as software, typically configures the packet classification mechanism to place rules that allow exact match in the hash directory as much as possible, keeping the TCAM space for those that require the flexibility of the TCAM.

In one embodiment, the forwarding TCAMs contain an entry that matches all IP multicast-addressed packets, causing them to be forwarded to process level (i.e., off the fast path). The flow label for a packet is received by the TCAMs, which then classify the packet as belonging to a multicast group. An indication is passed to the hash directory on each received IP multicast packet to look up the packet based on IP source and destination address. For example, an update mechanism (e.g., software, firmware, specialized circuitry etc.) receives a specification of a source and multicast group pair "(S,G)" and the associated forwarding action before receiving any packets with source address and destination address as (S,G). On receipt of such information, this mechanism adds an (S,G) entry to the hash directory and maps that entry to forwarding state for this as a multicast packet, corresponding to the forwarding action it determined from the multicast routing protocol. In this manner, a system can accommodate a large number of multicast groups in the hash directory without impacting the space available in a limited TCAM used for forwarding decisions.

Additionally, in one embodiment, the update mechanism may, on discovering a hash conflict between current entries and a new (S,G) entry it needs to add, choose to add this new (S,G) entry to the forwarding TCAM. By adding this entry earlier in the TCAM to the entry matching all IP multicast, this entry takes precedent. By further arranging for this entry to map to the desired multicast forwarding behavior, the software is further able to use the TCAM as a overflow assist to the hash table, eliminating one of the key disadvantages of implementing an associative memory as a hash table as compared to a true binary CAM.

A similar approach is used in one embodiment to handle unicast addressing of locally attached hosts. For example, in a large multi-layer enterprise system, a significant demand on the size of the routing table can be the routes to individual locally attached hosts, where the router needs to map to the specific MAC address of each host. One embodiment uses a separate entry in the forwarding TCAM for each such host which can use up many TCAM entries. In a more efficient manner, one embodiment uses for each prefix representing a set of directly connected hosts, a TCAM classification to match this prefix and specify a lookup in the hash directory matching just on destination address. An update mechanism adds a hash table entry for each such host H into the hash directory with an associated forwarding action that rewrites the MAC address and forwards it out the port associated with that host.

One embodiment is configured with broad security ACLs (say as a firewall), denying, for example, all incoming multicast on a specified interface. Such a system may participate in protocols that allow restrictive opening of "holes" in the firewall for specified flows. For example, a designated multicast flow may be allowed through. In this scenario, software can add these flow-specific permitting rules to the hash directory, with the associated "deny" entries in the TCAMs specifying a lookup in the hash directory by the appropriate key and mask combination. In this approach, the input ACL TCAM is not only relieved of providing the space for these specialized rules, but can avoid the churn of having rules added and removed as flows come and go, especially because the cost of modifying the TCAM contents may be quite expensive for the update mechanism on many platforms. In one embodiment, subfields of the flow label are looked up in binary associative memories to reduce the requirements for TCAMs.

In one embodiment, further user configuration may complicate the update mechanism required in using binary and ternary CAMs. For example, a network administrator may configure a system to monitor all traffic on a particular locally attached subnet using a netflow statistics capability. In this case, the update mechanism typically would need to revise the mask used for lookups in the hash directory for packets destined to this subnet to handle the full flow label and specify the appropriate forwarding action be applied to each such flow. In one embodiment, the microflow entries are automatically created from a flow parameter table, and the flow parameter table specifies the forwarding/redirection action for each flow that it automatically creates. One embodiment also specifies how to handle a packet for which it is unable to create a new microflow entry, ensuring the packets are not dropped or misdirected just because the traffic is being monitored.

Although this invention has been described using a hash table as the binary associative memory, it could be also implemented as a conventional binary CAM. It could also be implemented as a lookup structure, such as a TRIE.

Also, this invention could also be applied to other fields of a packet besides the conventional layer 2/3/4 flow label.

Further, other means of packet classification can be used to determine the binary associative memory lookup behavior and handling besides the results of a TCAM. For example, a packet header parser may determine a packet matches some characteristic that determines the binary associative memory handling, without relying on a TCAM classification.

Figure 1:
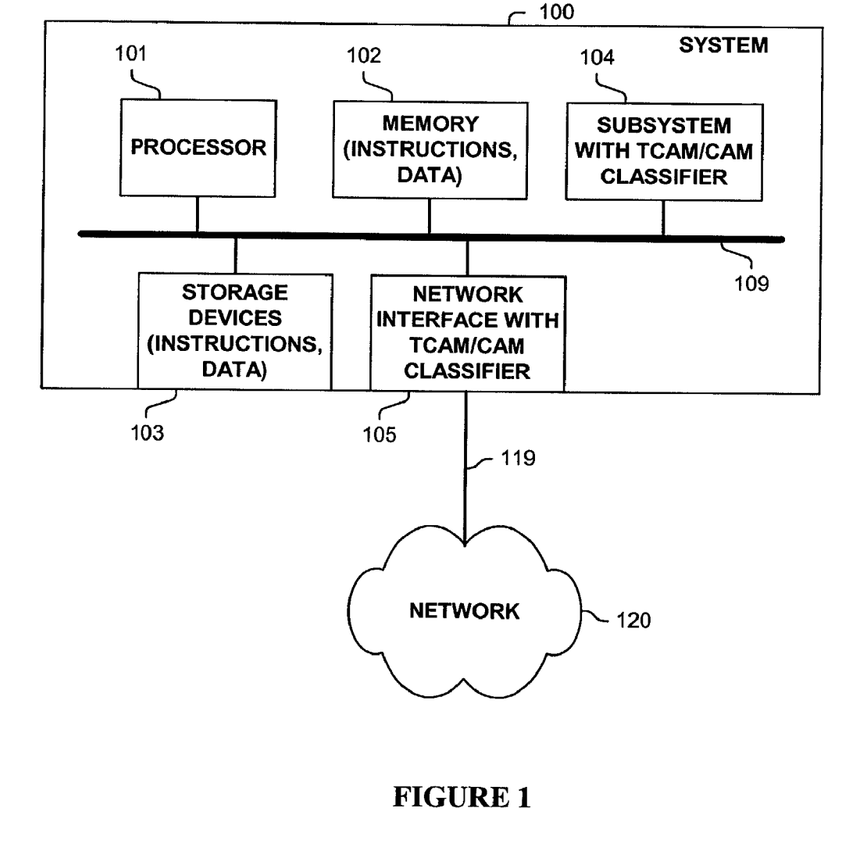
FIG. 1 is a block diagram of one embodiment of a system using ternary and binary content-addressable memory stages to classify packets.

FIG. 1 illustrates one embodiment of a system 100 using a TCAM/CAM classifier to classify information, such as received packets. For example, system 100 may be part of a communications system, packet switching system, router, computer system, etc. As shown, system 100 comprises a processor 101, memory 102, storage devices 103, subsystem with TCAM/CAM classifier 104, and network interface with TCAM/CAM classifier 105, which are electrically coupled via one or more communications mechanisms 109 (shown as a bus for illustrative purposes). Various embodiments of system 100 may include more or less elements. For example, two components, subsystem with TCAM/CAM classifier 104 and network interface with TCAM/CAM classifier 105, use packet classification methods and apparatus disclosed herein are shown in FIG. 1 as part of system 100 to emphasize the expansive nature and numerous embodiments of the invention. For example, system 100 may part of a packet switching system or router which uses packet classification methods and apparatus as part of a network interface or line card, and/or in another component or on separate chips, cards, boards, subsystems, etc.

The operation of system 100 is typically controlled by processor 101 using memory 102 and storage devices 103 to perform one or more tasks or processes. In one embodiment, system 100 programs or loads subsystem with TCAM/CAM classifier 104 and/or network interface with TCAM/CAM classifier 105 with control data entries for performing the packet classification according to the invention. Memory 102 is one type of computer-readable medium, and typically comprises random access memory (RAM), read only memory (ROM), integrated circuits, and/or other memory components. Memory 102 typically stores computer-executable instructions to be executed by processor 101 and/or data which is manipulated by processor 101 for implementing functionality in accordance with the invention. Storage devices 103 are another type of computer-readable medium, and typically comprise disk drives, diskettes, networked services, tape drives, and other storage devices. Storage devices 103 typically store computer-executable instructions to be executed by processor 101 and/or data which is manipulated by processor 101 for implementing functionality in accordance with the invention.

As used herein and contemplated by the invention, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

Figure 2A:
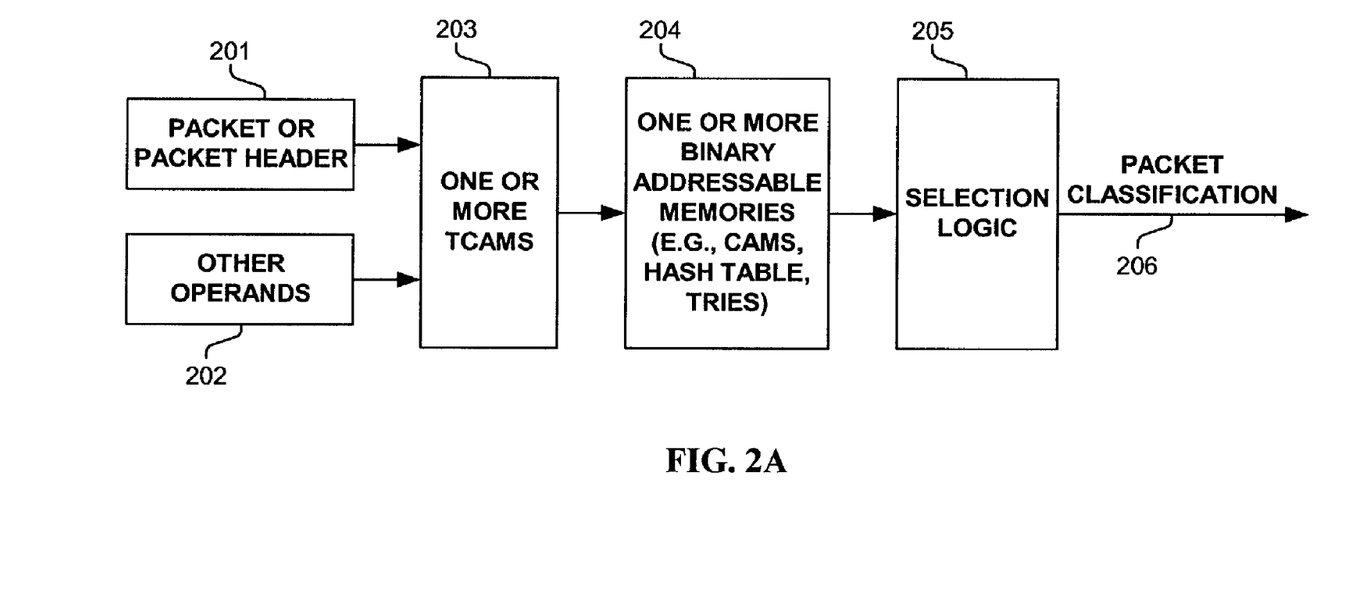
FIG. 2A is a block diagram of an exemplary embodiment of a packet classifier according to the invention.

FIG. 2A illustrates a block diagram of one embodiment of a packet classifier using a ternary content-addressable memory stage 203 and a binary addressable memory stage (e.g., CAM, hash table, TRIEs) 204 to classify packets. In the exemplary embodiment shown, packets or packet headers 201 and zero or more other operands 202 (e.g., QoS parameters, ACLs, routing information, etc.) are provided to one or more TCAMs 203. TCAMs 203, based on their programming, generate a result which is provided, either directly or through one or more components (not shown in FIG. 2) to one or more binary addressable memories 204, which in turn generate one or more classification indications. Optional selection logic 205, including but not limited to discrete logic, an encoder, a priority encoder, a multiplexer, or other selection mechanism or combination thereof, may be used to select between multiple classification indications generated by one or more binary addressable memories 204 to generate a packet classification signal 206.

Figure 2B:
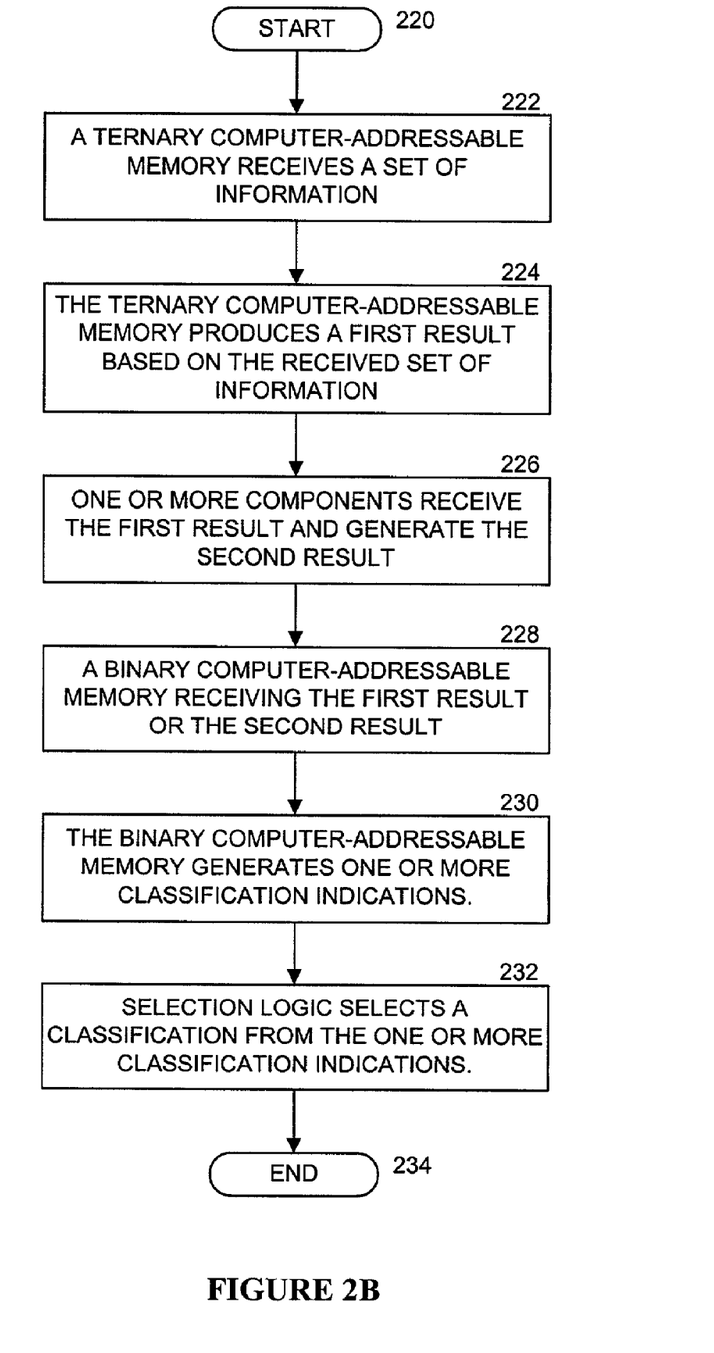
FIG. 2B is a flow diagram of an exemplary embodiment of a process performed by a packet classifier according to the invention.

The flow diagram shown in FIG. 2B illustrates one process for using a ternary content-addressable memory stage and a binary addressable memory stage to classify information or packets. Processing begins with process block 220, and proceeds to process block 222, wherein a TCAM receives a set of information to classify. Next, in process block 224, the TCAM generates a first result based on the received set of information. Next, in process block 226, optionally, one or more components receive the first result and generate a second result. Next, in process block 228, a CAM receives the first or second result, and, in process block 230, the CAM generates one or more classification indications. Then, optionally in process block 232, selection logic (e.g., a multiplexer, encoder, priority encoder, ASIC, discrete logic, etc.) selects a classification from the one or more classification indications. Processing is then complete as indicated by process block 234.

Figure 3:
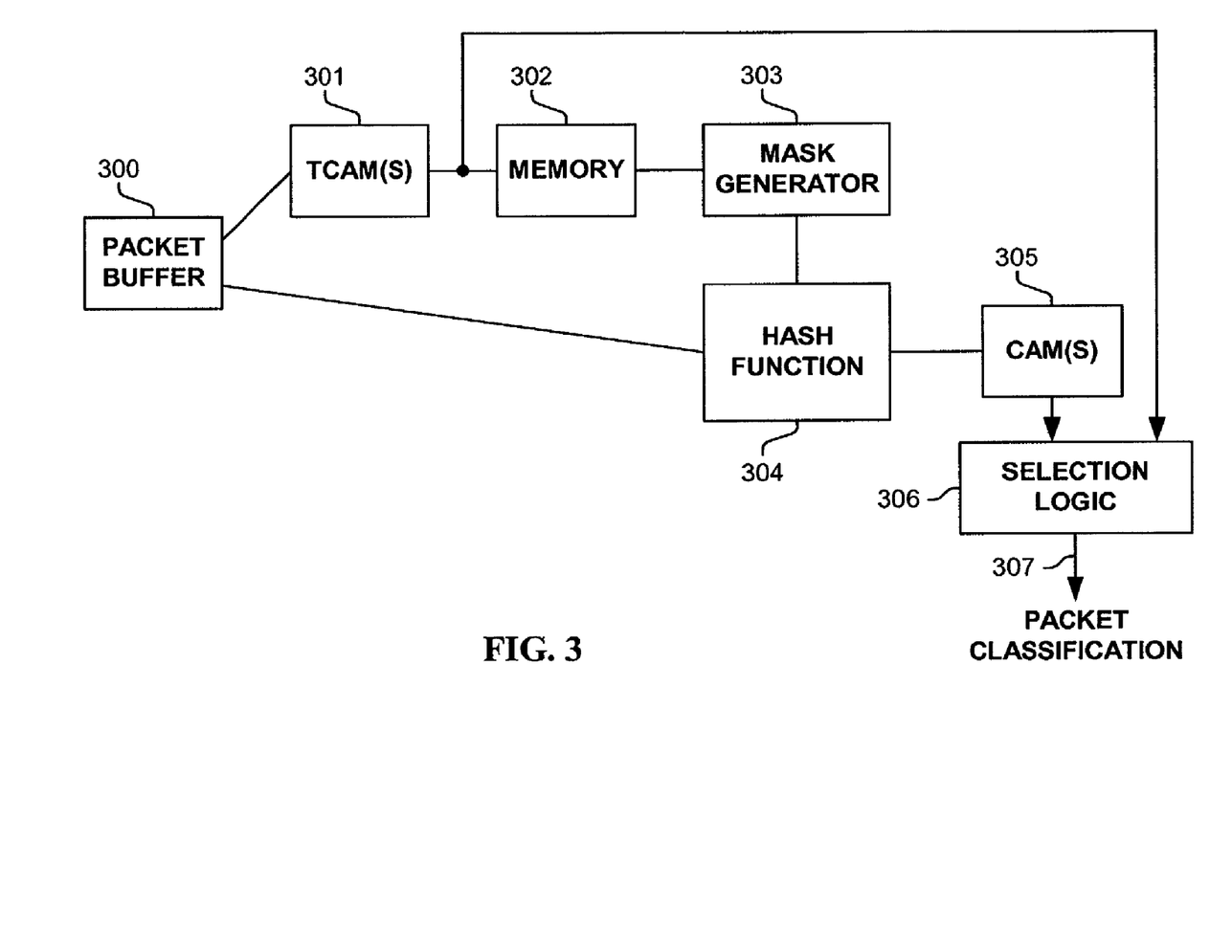
FIG. 3 is a block diagram of one embodiment of a packet classifier according to the invention.

FIG. 3 illustrates a block diagram of one exemplary embodiment including one or more TCAMs 301 for handling input and output classification (e.g., for ACLs, QoS, NAT, encryption, etc.) for a packet or packet header stored in packet buffer 300. This illustrated embodiment also includes one or more forwarding CAMs 305 to classify packets for IP forwarding decisions.

On packet reception, the packet flow label is extracted from the received packet and passed to the classification TCAMs 301. In one embodiment, TCAMs 301 typically accept a full flow label including IP source and destination addresses, protocol type, flags and layer 4 source and destination ports, a virtual local area network (VLAN) id and/or other fields. The system includes a hash directory of flow labels implemented in a large SRAM memory 302, suitable for flow classification for netflow statistics, microflow policing and redirection. Using on-chip SRAM, this hash directory may be implemented, for example, as a 16-set associative hash table, effectively implementing a binary associative memory. In one embodiment, TCAMs 301 produce an index which is used by classification memory 302 to return an entry that provides indications on forwarding, policing and/or other packet classification indications.

In one embodiment, the full flow label of the packet is then masked off by mask generator 303. A mask is typically selected based on other classifications applied to the packet, including classification produced by TCAM 301. The masked flow label is then used as the hashing key, and a lookup operation is performed in the hash directory using this mask in hash function 304. In one embodiment, a CAM or other lookup structure (e.g., TRIE) is used in place or, or in addition to the hash table. If a matching hash directory entry is found by hash function 304, the handling specified by this directory entry is used by one or more CAMs 305 to generate one or more classification indications and overriding the relevant handling that may have been determined by earlier packet classification mechanisms. If the one or more CAMs 305 may generate multiple classification indications, selection logic 306 is used to select between the classification indications, and to generate the packet classification 307. Additionally, selection logic 306 may further receive and use the result of generated by TCAMs 301 in making its selection. For example, in one embodiment, TCAMs 301 may generate a forwarding and/or policing decision, and CAMs 305 may be used to override this generated forwarding and/or policing decision.

Figure 4:
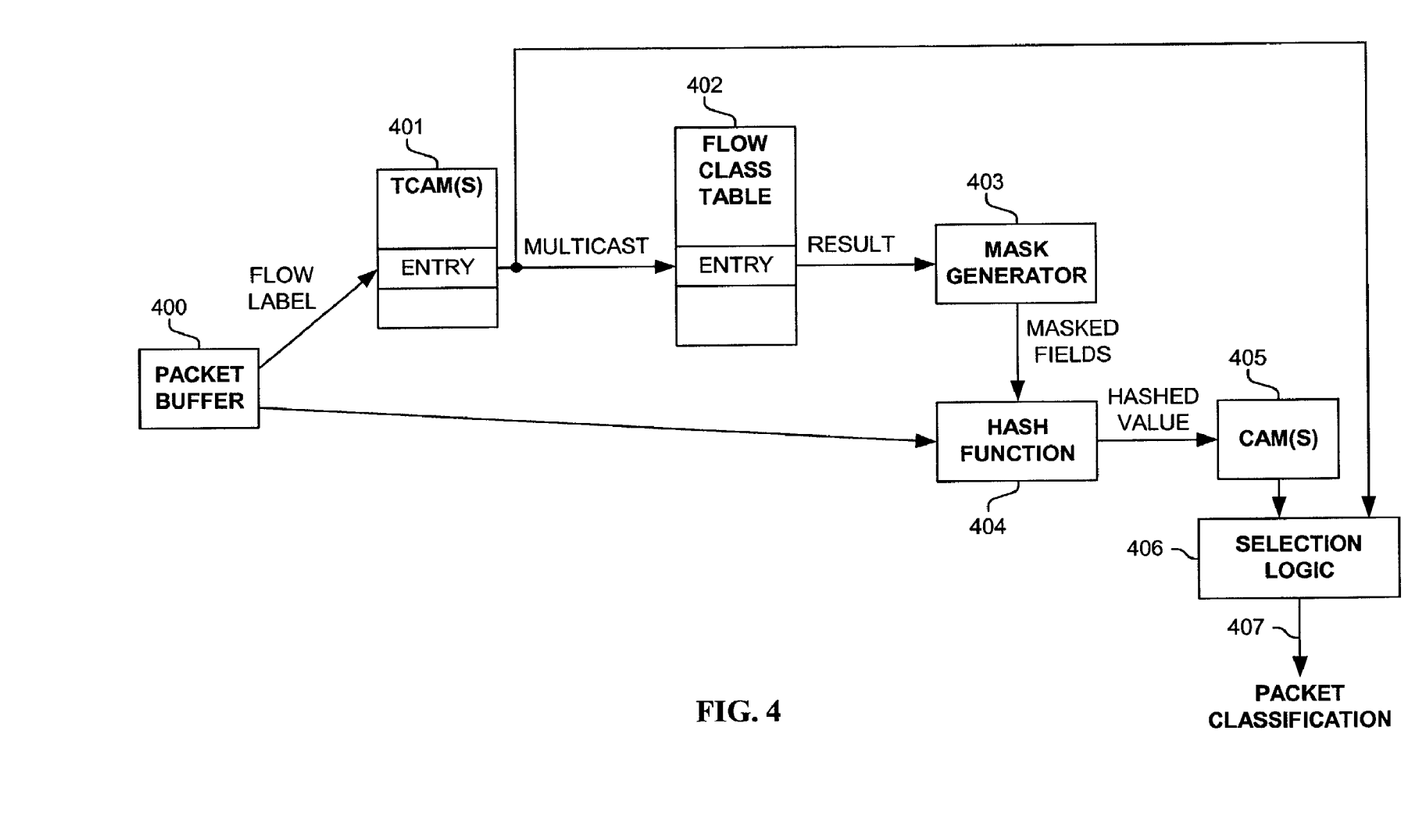
FIG. 4 is an annotated block diagram of exemplary embodiments of a packet classifier operating on a multicast packet according to the invention.

FIG. 4 illustrates one embodiment and its operation in which the one or more forwarding TCAMs 401 can contain an entry that matches all IP multicast-addressed packets, causing them to be forwarded to process level (i.e., off the fast path). The flow label for a packet is received by TCAMs 401 from packet buffer 400. TCAMs 401 classifies the packet as belonging to a multicast group, and a lookup is performed in flow class table 402, typically based on the source and group address of the multicast packet. In one embodiment, TCAMs 401 produce an index which is used by classification memory 402 to return an entry that provides indications on forwarding, policing and/or other packet classification indications.

In one embodiment, the result of the lookup performed in memory 402 is then masked by masked generator 403, with the resulting indication passed to the hash function 404 on each received IP multicast packet to look up the packet based on IP source and destination address. The hashed value of the flow label is then used by one or more CAMs 405 to perform the final classification stage. One or more CAMs 405 typically generate one or more selection indications, which are then selected between by selection logic 406 to generate the packet classification 407. In a system where one or more CAMs 405 generate a single packet classification (i.e., packet classification 407), selection logic 406 could be eliminated.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A system for classifying a set of information, the system comprising:
    a ternary content-addressable memory configured to receive the set of information, and to perform a lookup operation with a search key based on the set of information to produce a first result;
    a subsystem to receive the first result and to derive a second result from the first result, wherein the subsystem includes a memory coupled to a mask generator coupled to a hash function; and
    a binary content-addressable memory configured to receive the second result derived from the first result, and to perform a lookup operation with a search key based on the second result to generate one or more classification indications.

2. The system of claim 1, wherein the set of information includes information contained in a packet.

3. The system of claim 1, wherein the set of information includes one or more fields from a header of a packet.

4. The system of claim 1, wherein the set of information includes a source address and a destination address of a packet.

5. The system of claim 1, wherein the set of information includes a group address for a packet.

6. The system of claim 1, further comprising a selection logic for selecting between the one or more classification indications.

7. The system of claim 6, wherein the selection logic includes a priority encoder.

8. The system of claim 1, further comprising means for selecting between the one or more classification indications.

9. The system of claim 1, comprising means for deriving the second result from the first result.

10. The system of claim 1, wherein the memory comprises a flow class table.

11. The system of claim 10, wherein the set of information includes one or more fields from a header of a packet.

12. A packet switching system including the system of claim 1.

13. A computer system including the system of claim 1.

14. A communications system including the system of claim 1.

15. A router including the system of claim 1.

16. A system for classifying a set of information, the system comprising:
    a ternary content-addressable memory configured to receive the set of information, and to perform a lookup operation with a search key based on the set of information to produce a first result;
    a table configured to receive the first result and to produce a second result based on the first result as an index into the table;
    a mask generator configured to receive the second result and to produce a third result;
    a hash function configured to receive the third result and to produce a fourth result based on the third result used as a hashing key; and
    a binary content-addressable memory configured to receive the fourth result and to perform a lookup operation with a search key based, on the fourth result to produce one or more classification indications.

17. The system of claim 16, wherein the set of information includes information contained in a packet.

18. The system of claim 16, further comprising a selection logic to select between the one or more classification indications.

19. The system of claim 16, further comprising means for selecting between the one or more classification indications.

20. A method for classifying a set of information, the method comprising:
    a ternary content-addressable memory receiving the set of information;

the ternary content-addressable memory performing a lookup operation with a search key based on the set of information to produce a first result;

generating a second result from the first result, wherein said generating the second result from the first result includes performing a memory lookup and a mask generation;

a binary content-addressable memory receiving the second result derived from the first result; and the binary content-addressable memory performing a lookup operation with a search key based on the second result to generate one or more classification indications.

21. The method of claim 20, wherein the set of information includes information contained in a packet.

22. The method of claim 20, wherein the set of information includes one or more fields from a header of a packet.

23. The method of claim 20, further comprising selecting between the one or more classification indications.

24. The method of claim 20, wherein generating the second result from the first result includes retrieving the second result from a memory based on the first result.

25. A packet switching system performing the method of claim 20.

26. A computer system performing the method of claim 20.

27. A communications system performing the method of claim 20.

28. A router performing the method of claim 20.

29. A method for classifying a set of information, the method comprising:

a ternary content-addressable memory receiving the set of information;

the ternary content-addressable memory performing a lookup operation with a search key based on the set of information to produce a first result;

generating a second result from the first result, wherein said generating the second result from the first result includes performing a memory lookup, a mask generation and a hashing operation;

a binary content-addressable memory receiving the second result derived from the first result; and the binary content-addressable memory performing a lookup operation with a search key based on the second result to generate one or more classification indications.

30. A method for classifying a set of information, the method comprising:

a ternary content-addressable memory receiving the set of information;

the ternary content-addressable memory performing a lookup operation with a search key based on the set of information to produce a first result;

generating a second result from the first result, wherein said generating the second result from the first result includes performing a memory lookup and a hashing operation;

a binary content-addressable memory receiving the second result derived from the first result; and the binary content-addressable memory performing a lookup operation with a search key based on the second result to generate one or more classification indications.

31. A system for classifying a multicast packet, the system comprising:

a ternary content-addressable memory configured to receive a flow label including a source address and a group address of the multicast packet, and to perform a lookup operation with a search key based on the flow label to produce a first lookup result;

a flow class table configured to receive the first lookup result and to produce a classification indication using an index into the flow class table, the index being identified based on the first lookup result;

a mask generator configured to receive the classification indication and to generate a masked fields indication based on the classification index;

a hash function configured to generate a hashing key based on the flow label and the masked fields indication, and to produce a hashed value based on the hashing key; and a binary content-addressable memory configured to receive the hashed value and to perform a lookup operation with a search key based on the hashed value to produce a classification indication of the multicast packet.

* * * * *

UNITED STATES PATENT AND TRADEMARK OFFICE
CERTIFICATE OF CORRECTION

PATENT NO. : 7,002,965 B1  
DATED : February 21, 2006  
INVENTOR(S) : David Cheriton It is certified that error appears in the above-identified patent and that said Letters Patent is hereby corrected as shown below:

Column 4,  
Line 54, replace "chum" with -- churn --.

Column 8,  
Line 55, replace "based, on" with -- based on --.

Signed and Sealed this

Sixteenth Day of May, 2006

JON W. DUDAS  
*Director of the United States Patent and Trademark Office*